L. H. LEHMAN.
BALANCING APPARATUS.
APPLICATION FILED MAY 19, 1915.

1,266,029.

Patented May 14, 1918.

2 SHEETS—SHEET 2.

Witnesses:
Louise Endule
David H. Daylan

Louis H. Lehman, Inventor
By his Attorney
Thomas C. Hill

UNITED STATES PATENT OFFICE.

LOUIS H. LEHMAN, OF NEW YORK, N. Y.

BALANCING APPARATUS.

1,266,029.  Specification of Letters Patent.  Patented May 14, 1918.

Application filed May 19, 1915. Serial No. 29,201.

*To all whom it may concern:*

Be it known that I, LOUIS H. LEHMAN, a citizen of the United States, residing at New York city, in the county of New York and State of New York, have invented certain new and useful Improvements in Balancing Apparatus, of which the following is a specification, reference being had therein to the accompanying drawing.

My invention relates to means for establishing and definitely controlling balance, equilibrium or equipoise in the accomplishment of which the positions of the center of gravity or of the center of support may be changed. The invention is particularly well adapted for use in connection with aircraft and may be employed therewith for stabilizing purposes although of course it will be understood that it may be employed upon other vehicles and in other places.

Figure 1:
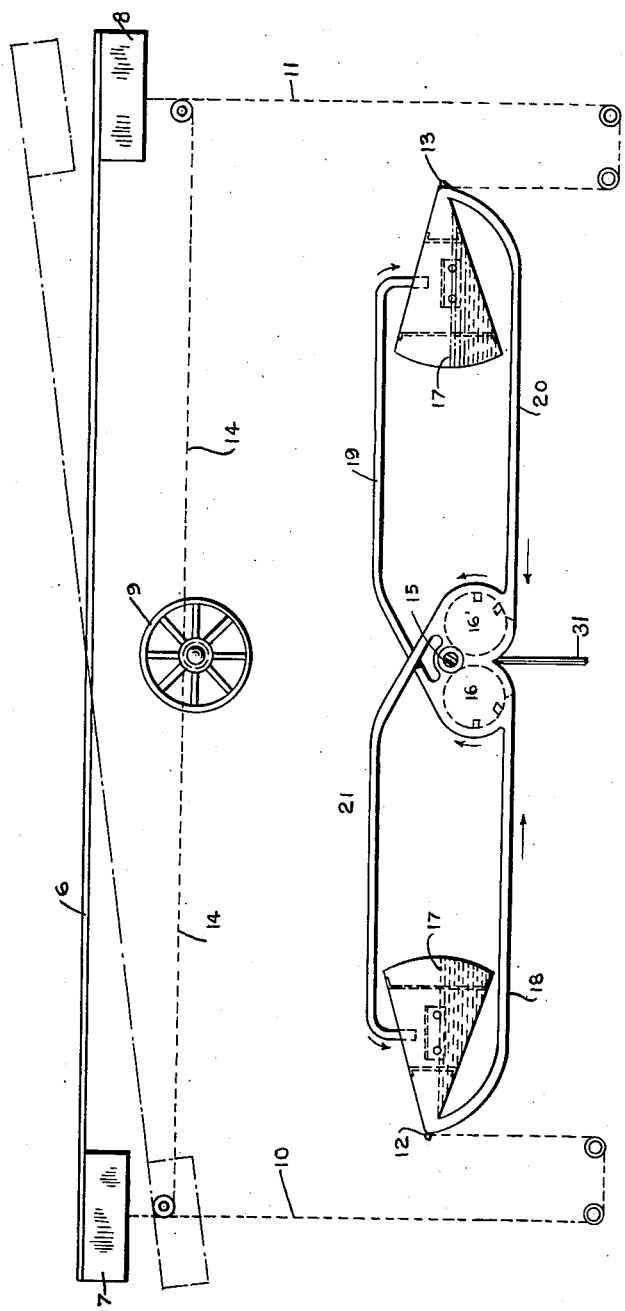
Figure 2:
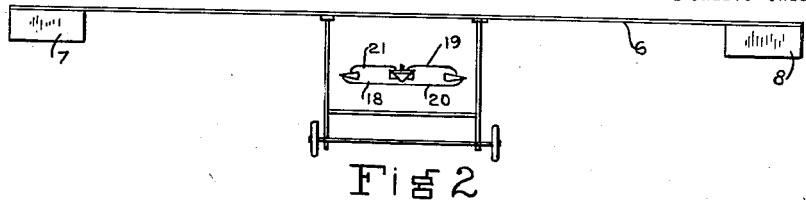
Figure 3:
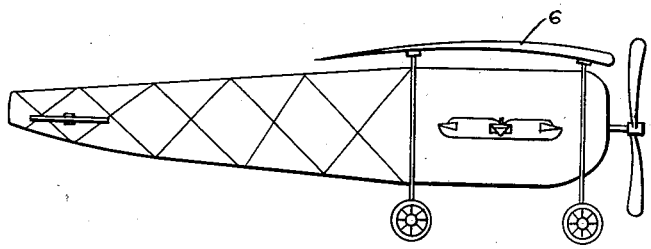
Figure 4:
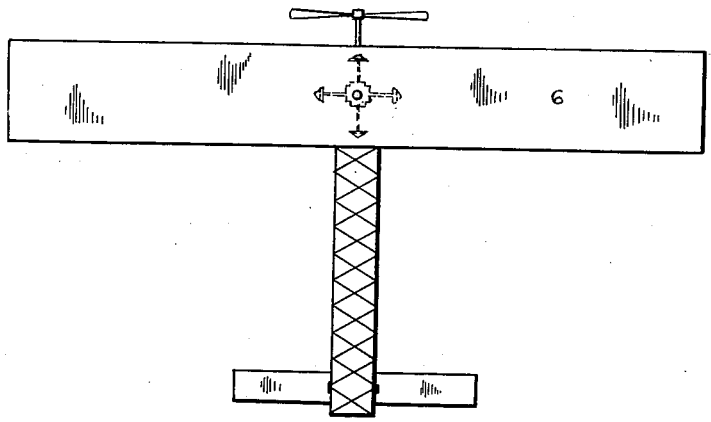

In the accompanying drawings I have illustrated an application of my invention as adapted for use with an aeroplane of any well known type such as a monoplane, and in said drawings Figure 1 illustrates diagrammatically an application of my invention as applied to an aeroplane showing the same connected to the control mechanism and the ailerons thereof. Fig. 2 is an end view of a monoplane type of craft showing the position of the device on a smaller scale. Fig. 3 is a side view of the same. Fig. 4 a plan view of the same, and Fig. 5 a front elevation of a modified form of apparatus embodying the invention.

While I have shown certain pipes, ducts or tubes in combination with certain reservoirs, containers, or receptacles in the accompanying drawings, it will of course be readily understood that other forms of ballast and conductors may be employed. And it will also be understood from what follows that the invention may be employed in maintaining transverse and longitudinal balance or either without any substantial departure from the invention even in the form illustrated in the accompanying drawings.

In Fig. 1 of said drawings, 6 indicates a surface of an aeroplane, and 7—8 the ailerons movably secured thereupon. 9 is the pilot wheel by which the machine is usually controlled, and 10—11 the usual cables or wires connected to the ailerons and in the drawing connected at the opposite ends to my stabilizing device as indicated at 12—13. 14 indicates another wire or cable connecting the ailerons with the pilot wheel. 15 indicates the pivot or axis which forms the bearing for my stabilizing device, and 16—16' a suitable pump or several of them for maintaining a circulation of liquid such as water or mercury 17 through the apparatus as follows:

Assuming that the device is mounted transversely upon an aeroplane as indicated diagrammatically in Fig. 1, and that the aeroplane dips on the left side, the liquid 17 at the left or falling side drains into the duct or tube 18 and following the direction of the arrow is immediately taken up by the pump 16—16' and passed through the tube 19 which discharges into the receptacle at the right side thereby shifting the weight to the elevating side of the craft. Likewise, if the machine dips at the right side the liquid 17 in the container at the right or falling side of the craft empties into the duct 20 which is drawn therefrom by the pump 16—16' following the direction of the arrows, and through the pipe or duct 21 discharging into the container at the left or rising side thereby counteracting the unbalancing tendency of the craft. In other words, the stabilizing device seeks to oppose any tendency of the craft to become unbalanced.

Assuming that the stabilizer is constructed so as to be effected both longitudinally and transversely as indicated in Figs. 2 to 4 inclusive, the same being mounted upon a suitable centrally located pivot 15, it will be readily understood that any tendency for the aeroplane to dip or rise will be likewise counteracted or opposed by the stabilizer the same as any lateral unbalancing tendency. Of course it will be understood that the stabilizer may be made sufficiently large to produce an effective correcting tendency in itself or it will of course be readily understood that the same may be applied on a small scale so that its rectifying operation or inclination may be used to set in motion or affect a more powerful actuating mechanism by any well known means. My stabilizing device as shown in Fig. 1, may also be connected to the ailerons, or to the control mechanism or both so that its opposing or correcting tendency may be felt by the operator. In that case, such as illustrated in Fig. 1, the stabilizer being connected to the ailerons serves to operate them to correct the unbalancing of the machine and this being felt by the operator at the wheel 9 he also may increase the action of the stabilizer and bring as much surface of the ailerons into action as he deems necessary for rapid correction of the unbalanced condition of the machine.

Figure 5:
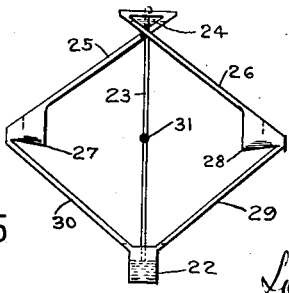

Referring to the modification illustrated in Fig. 5, it will be seen that liquid such as mercury or water may be contained in a receptacle such as 22 and any suitable pumping mechanism may be employed to constantly transfer the same therefrom through a suitable pipe such as 23 into the chamber 24 from which point the liquid is free to fall over the sides of said chamber into the ducts or pipes 25—26 emptying into the chambers 27—28 which in turn allow the liquid to pass back to the original chamber 22. From this it will be seen that if the device shown in Fig. 5 is depressed on the right side, the liquid from the chamber 28 travels to the container 22 by the pipe 29 thus relieving the weight on the falling side and simultaneously the liquid in the container 24 spills into the rising chamber 27 through the pipe 25 thus putting additional weight on the rising side. Likewise, if the left side falls some of the liquid in the left container 27 returns to the container 22 through the pipe 30 thus reducing the weight on the falling side and some of the fluid from the container 24 is poured through connecting tube 26 into the rising container 28 thus serving to increase the weight at the rising side. In this form of device a centrally located pivotal support such as 31 may be arranged to support the device and four pockets or containers such as 27—28 may be arranged at right angles so as to make the device operative both longitudinally as well as transversely.

I claim:

1. In an apparatus of the class described, a liquid circulating system whereby any tendency of said apparatus to become unbalanced is opposed by the automatic shifting of the liquid circulated therein, said opposition set in action by a pump, and containers at opposite sides of said system adapted to pocket said liquid according to the balance of said apparatus.

2. In an apparatus of the class described, a liquid circulating system provided with containers at opposite sides of said apparatus and means for automatically charging and discharging said containers to oppose any change in the horizontal balance of said apparatus, said means being adapted to drive said liquid in opposite directions to each of said containers.

In testimony whereof I hereunto affix my signature in the presence of two witnesses.

LOUIS H. LEHMAN.

Witnesses:
 LOUISE ENDERLE,
 THOMAS A. HILL.